Oct. 13, 1964 H. C. METTLER Re. 25,657

ULTRASONIC FREQUENCY GENERATING CRYSTAL ASSEMBLY

Original Filed June 18, 1957

INVENTOR.

Hal C. Mettler

United States Patent Office

Re. 25,657
Reissued Oct. 13, 1964

25,657
ULTRASONIC FREQUENCY GENERATING CRYSTAL ASSEMBLY

Hal C. Mettler, 1709 Putney Road, Pasadena, Calif.

Original No. 3,025,419, dated Mar. 13, 1962, Ser. No. 666,344, June 18, 1957. Application for reissue Apr. 12, 1963, Ser. No. 272,815
8 Claims. (Cl. 310—9.1)

Matter enclosed in heavy brackets [ ] appears in the original patent but forms no part of this reissue specification; matter printed in italics indicates the additions made by reissue.

My invention relates to an ultrasonic frequency generating crystal assembly and included in the objects of my invention are:

First, to provide an ultrasonic frequency generating crystal assembly wherein all but the base surface of the crystal is exposed to the liquid into which the ultrasonic energy is to be transmitted thereby not only materially improving the efficiency of transmission of the ultrasonic energy but also materially improving the dissipation of heat generated within the crystal.

Second, to provide an ultrasonic frequency generating crystal assembly which incorporates an effective but extremely simple and inexpensive means for electrical connection of the crystal as well as securing and sealing the crystal in its setting or mounting.

Third, to provide an ultrasonic frequency generating crystal assembly which is adapted to the utilization of relatively thin crystals for producing the higher ultrasonic frequencies required in therapeutic applications, and which in such applications, makes possible an extremely light weight and compact instrument capable of particularly efficient transmission of ultrasonic frequencies to the patient's body.

Fourth, to provide an ultrasonic frequency generating crystal which is also adapted to the utilization of relatively large crystals for producing the lower ultrasonic frequencies and having a substantial power output such as required in ultrasonic cleaning procedures, and which in such applications, the maximum area of the crystal is exposed to heat exchanging contact with the transmitting liquid so that the heat generated in the crystal may be effectively dissipated, thus permitting maximum power output from the crystal.

With the above and other objects in view as may appear hereinafter, reference is directed to the accompanying drawings, in which.

Figures 1, 2, 3, 4, 5, 6:
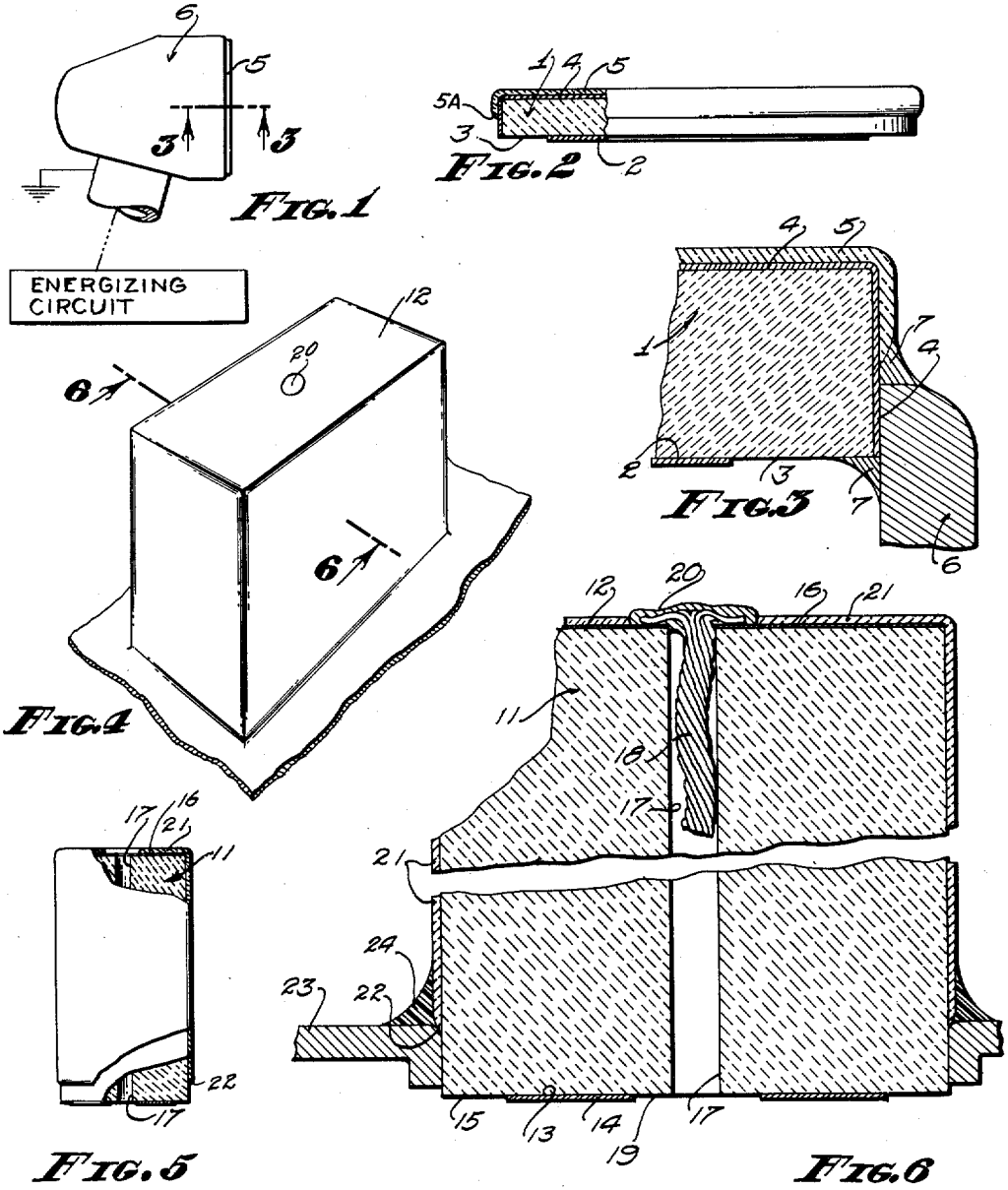
FIGURE 1 is a fragmentary side view of a therapeutic applicator with an ultrasonic frequency transmitting crystal mounted therein in accordance with my invention.
FIGURE 2 is a partial sectional, partial side view of the crystal as utilized for therapeutic purposes.
FIGURE 3 is an exaggerated fragmentary sectional view taken through 3—3 of FIGURE 1 showing the manner in which the crystal is mounted in the therapeutic applicator.
FIGURE 4 is a fragmentary perspective view of an ultrasonic frequency transmitting crystal dimensioned for producing ultrasonic frequencies in the lower range and shown mounted in a wall of a vessel intended to contain the crystal and a cleansing liquid, the wall being shown fragmentarily.
FIGURE 5 is an end view of the crystal shown in FIGURE 4 as it appears before installation, with portions broken away and in section to illustrate the internal construction.
FIGURE 6 is an exaggerated fragmentary sectional view taken through 6—6 of FIGURE 4 showing the manner in which the crystal is mounted in the wall of a container.

Crystals utilized for producing ultrasonic frequencies exhibit piezoelectric properties and may be either natural or artificial crystals or ceramics. One type of artificial crystal or ceramic which is widely used is composed of barium titanate. This material has proved applicable in the exercise of my invention; however, the invention is not limited to this material.

Reference is first directed to FIGURES 1 to 3 in which is illustrated the application of my invention to a therapeutic instrument. In this application, the crystal 1 is in the form of a relatively thin flat disk. The thickness of the crystal determines the frequency of the ultrasonic output of the crystal. The crystal is provided with a first plating or coating 2 of conductive material on its bottom surface. For example, this may be a plating of silver. The conductive coating 2 is preferably smaller in diameter than the crystal exposing an unplated margin 3.

A second conductive coating 4, which may also be a plating of silver, is applied over the upper surface as well as its sides, and preferably extends to the bottom surface. The conductive coatings are separated by the unplated margin 3.

A protecting coating 5 is applied over the upper surface of the crystal and is extended part way down the sides thereof to form a shoulder 5A. The protective coating is preferably a glaze such as used in coating ceramics and is baked on. A glaze is selected which can be bonded at temperatures which will not affect the underlying conductive coating 4.

The crystal thus prepared is adapted to be set in a mounting head 6 which may be merely a cup-shaped spinning or stamping having a mouth dimensioned to receive the crystal. The periphery of the crystal below the protective coating 5 is coated with a conductive adhesive 7 such as an epoxy resin containing metal, commonly known as "cold-solder." Care is taken, of course, not to bridge the uncoated margin 3. The cold solder provides an electrical connection between the conductive coating 4 and the mounting head 6, affords a dependable mechanical connection to hold the crystal in place, and also effectively seals the connection between the crystal and the mounting head.

The crystal is connected, as indicated in FIGURE 1, to a suitable conventional energizing circuit by a ground lead connected to the mounting head, and a second lead connected to the first conductive coating 2. Application of electrical energy at the proper frequency causes the crystal to expand and contract between its bottom and top surfaces at a corresponding frequency and generate an ultrasonic frequency [predelivered] *predetermined* by the thickness of the crystal.

The crystal is utilized by placing it in contact with the patient's body. An oil or other liquid is applied to the crystal and to the patient's skin to provide a liquid transmitting medium. The oil or other liquid not only serves to transmit the ultrasonic vibrations, but also tends to dissipate heat from the crystal.

However, in the application of this invention to high frequency ultrasonic crystals for therapeutic purposes, the problem of heat dissipation, while present, is not the principal problem. It is, instead, the problem of efficient transmission of the vibration from the crystal to the body tissues. By reason of the fact that the crystal is in virtually direct contact with the skin or the transmitting liquid, that is, separated therefrom only by the metal plating or conductive coating 4 and the protective coating 5, which need be only a few thousands of an inch, the vibrations are transmitted with a minimum of loss.

Reference is now directed to FIGURES 4 to 6. The construction here illustrated is primarily directed to the use of crystals of substantial thickness and therefore intended to produce relatively low ultrasonic frequencies.

As noted previously, the operating frequency of the crystal is determined by its thickness. Thus, in the first instance hereinbefore described, the crystal is in the order of an eighth of an inch in thickness and functions in the megacycle range, whereas, in the construction shown in FIGURES 4 to 6, the crystal may be in the range of two inches thick and operates in the range about twice that of audible sound; for example, in the range of 40,000 cycles per second.

Crystals of the larger size have many uses, one of which is in effecting ultrasonic cleaning of parts emersed in a liquid bath in which the liquid is caused by the crystal to vibrate at some selected ultrasonic frequency. In such installations, the power output requirements of the crystals is severe and heating problems are serious.

Thus, as shown in FIGURES 4 to 6, a relatively large, or thick, low, ultrasonic crystal 11 is utilized. The crystal is illustrated as a rectangular block, the thickness of which, between its top side 12 and bottom side 13, determines its vibration frequency. For purposes of output into the surrounding transmitting and cooling liquid, not shown, the crystal may be a cube, or have lateral dimensions greater than its thickness; however, this would reduce the ability of the crystal to dissipate its internal heat. Therefore, it is preferred to construct the crystal with one lateral dimension as small as is consistent with good oscillation characteristics.

The bottom or base side of the crystal is provided with a conductive coating 14 which may, for example, be a plating of silver. The coating preferably terminates inwardly from the margins of the crystal as indicated by 15 to insulate the conductive coating. The top side 12 is provided with a second conductive coating 16 which may be coextensive with the top surface. The second coating 16 may extend part way down the side walls as in the case of the first described construction; however, in order to convert the crystal into a piezoelectric crystal, it is necessary to impress the crystal with a direct current voltage many times greater than the operating voltage. In the case of relatively thin crystals as in the first described construction, this is not a problem, but in the case of crystals of substantial thickness, the impressing voltage may be so high that conductive coating on the side walls cannot be tolerated.

This also poses a problem of electrical connection with the second coating. This is solved by providing a small bore 17 through the crystal between the bottom and top sides which receives a conductor 18. The bottom conductive coating 14 terminates clear of the bore 17 as indicated by 19. The upper end of the conductor is soldered or otherwise electrically connected, as indicated by 20, to the top or second conductive coating 16. Installation of the conductor is made after the impressing voltage has been applied to the crystal.

After installation of the conductor 18, the top and lateral sides are coated with a glaze 21, or other protective coating, which seals the surfaces of the crystal and provides insulation. As in the first described structure, any of the various glazes used on ceramics, having the requisite electrical properties and sufficiently low fusing temperature as not to damage the conductive coating, may be used.

The protective coating preferably terminates short of the bottom side 13 to form a shoulder 22 which aids in mounting the crystal. The crystal is mounted in a wall 23, preferably the bottom wall of a vessel or container which is intended to contain the cleaning solution and the parts to be cleaned. The bottom wall 23 is provided with an aperture dimensioned to receive the crystal as shown in FIGURE 6. A coating of a resin adhesive, such as an epoxy adhesive 24, is applied around the base of the crystal. In this case the adhesive need not be conductive. The conductor 18 is grounded to the bottom wall 23 of the vessel so that the top conductive coating, conductor, and vessel walls are maintained at ground potential.

Except for the bottom side 13 and the narrow zone fitted within the bottom wall 23, the entire crystal is exposed to the liquid which fills the container or vessel in which the crystal is mounted. As a consequence, heat may be radiated not only from the top side 12 but also from all four lateral sides of the crystal directly into the liquid. This permits a corresponding increase in power which may be applied to the crystal without the crystal overheating.

Although I have shown and described certain embodiments of my invention, I do not wish to be limited thereto, but desire to include in the scope of my invention the novelty inherent in the appended claims.

I claim:

1. An ultrasonic frequency generating crystal assembly comprising a grounded conductive mounting member having an aperture therein, a crystal adapted, when energized, to generate an ultrasonic frequency predetermined by its dimensions, the crystal having upper and lower parallel surfaces and a side disposed between the surfaces, a first conductive coating on at least a portion of the lower surface, a second conductive coating covering at least a portion of the upper surface and a portion of the side of the crystal, the crystal being disposed within the aperture so that the upper surface of the crystal projects outwardly from the mounting member, the mounting member being arranged to provide a space adjacent substantially the entire lower surface of the crystal to permit free movement of the lower surface of the crystal in a direction normal to the lower surface, a protective coating completely covering at least the portion of the second conductive coating disposed on the upper surface, and conductive seal means disposed between a portion of the side extending completely around the crystal and the mounting member to secure the side of the crystal to the mounting member and to provide an electrical connection between the second coating and the mounting member, the seal means being arranged to prevent electrical contact between the first coating and the mounting member.

2. The combination as defined in claim 1 wherein the first coating is arranged to provide an uncoated marginal area on the lower surface completely surrounding the first coating to isolate the first coating from the side of the crystal.

3. The combination as defined in claim 2 wherein the crystal is cylindrical, and wherein the second conductive coating is arranged to completely cover the upper surface of the crystal, the protective coating being arranged to completely cover the second conductive coating disposed on the upper surface of the crystal and a portion of the conductive coating disposed on the side of the crystal.

4. The combination as defined in claim 3 wherein the protective coating defines a shoulder completely surrounding the side of the crystal and disposed between the upper and lower surfaces thereof.

5. In an ultrasonic frequency generating crystal assembly the combination comprising a grounded conductive mounting member having a cavity therein with an opening on one side of the member communicating with the cavity, a cylindrical crystal adapted, when energized, to generate an ultrasonic frequency predetermined by its dimensions, the crystal having upper and lower parallel surfaces and a peripheral side extending between the surfaces, a first conductive coating on the central portion of the lower surface, the first conductive coating being arranged to provide an uncoated marginal area on the lower surface completely surrounding the first coating to isolate the first coating from the side of the crystal, a second conductive coating completely covering the upper surface and a portion of the side of the crystal, the crystal being disposed within the cavity of the body member with the upper surface and a portion of the side of the crystal projecting outwardly from the opening in the mounting member and the lower surface extending within the cavity to permit free undamped movement of the lower surface in a direction normal thereto, an epoxy resin having a conductive material embedded therein disposed between the mounting member and at least the side portion of the crystal adjacent thereto for providing a resilient mounting for the crystal and an electrical connection between the second conductive coating and the mounting member, and an insulating protective coating completely covering the second conductive coating disposed on the upper surface and the portion of the second conductive coating disposed on the side of the crystal which is not covered by the epoxy resin.

*6. An ultrasonic frequency generating crystal assembly comprising a grounded conductive mounting member having an aperture therein, a crystal adapted, when energized, to generate an ultrasonic frequency predetermined by its dimensions, the crystal having a substantially flat upper surface and a lower parallel surface and a side disposed between the surfaces, a first conductive coating on at least a portion of the lower surface, a second conductive coating covering at least a portion of the upper surface, the crystal being disposed within the aperture so that the upper surface of the crystal projects outwardly from the mounting member, the mounting member being arranged to provide a space adjacent substantially the entire lower surface of the crystal to permit free movement of the lower surface of the crystal in a direction normal to the lower surface, a protective coating disposed on the upper surface, seal means disposed between the crystal and the mounting member and extending completely around the crystal to secure the crystal to the mounting member and electrical conductive means adapted for providing an electrical connection between the second coating at the front of said crystal and the grounded conductive mounting member.*

*7. An ultrasonic frequency generating crystal assembly comprising a mounting member having an aperture therein, a crystal adapted, when energized, to generate an ultrasonic frequency predetermined by its dimensions, the crystal having a substantially flat upper surface and a lower parallel surface and a side disposed between the surfaces, a first conductive coating on at least a portion of the lower surface, a second conductive coating covering at least a portion of the upper surface and a portion of the side of the crystal, the crystal being disposed within the aperture so that the upper surface of the crystal projects outwardly from the mounting member, the mounting member being arranged to provide a space adjacent substantially the entire lower surface of the crystal to permit free movement of the lower surface of the crystal in a direction normal to the lower surface, a protective coating completely covering at least the portion of the second conductive coating disposed on the upper surface, seal means disposed between the crystal and the mounting member and extending completely around the crystal to secure the crystal to the mounting member and electrical conductive means adapted for providing a grounded electrical connection to the second coating at the upper surface of said crystal through the portion of said second coating at the side of said crystal.*

*8. An ultrasonic frequency generating crystal assembly comprising a grounded conductive mounting member having an aperture therein, having an outer edge, a crystal adapted, when energized, to generate an ultrasonic frequency predetermined by its dimensions, the crystal having a substantially flat upper surface and a lower parallel surface and a side disposed between the surface, a first conductive coating on at least a portion of the lower surface, a second conductive coating covering at least a portion of the upper surface, the crystal being disposed within the aperture so that the upper surface of the crystal faces out of the aperture and extends to at least the outer edge of the aperture, the mounting member being arranged to provide a space adjacent substantially the entire lower surface of the crystal to permit free movement of the lower surface of the crystal in a direction normal to the lower surface, a protective coating completely covering at least the portion of the second conductive coating disposed on the upper surface, seal means disposed between the crystal and the mounting member and extending completely around the crystal to secure the crystal to the mounting member and electrical conductive means adapted for providing an electrical connection between the second coating at the upper surface of said crystal and the grounded conductive mounting member.*

References Cited by the Examiner

The following references, cited by the examiner, are of record in the patented file of this patent or the original patent

UNITED STATES PATENTS

| | | | |
|---|---|---|---|
| 2,283,285 | 5/42 | Pohlman | 310—8.7 |
| 2,431,233 | 11/47 | Erwin | 310—8.7 |
| 2,460,153 | 1/49 | Smoluchowski | 310—8.7 |
| 2,494,433 | 1/50 | Erwin | 310—8.9 |
| 2,549,872 | 8/51 | Willard | 310—9.7 X |
| 2,587,304 | 2/52 | Fiske et al. | 310—8.7 |
| 2,666,862 | 1/54 | Branson | 310—8.7 |
| 2,761,076 | 8/56 | Hansell | 310—9.1 |
| 2,788,454 | 4/57 | Zapponi | 340—10 |
| 2,803,129 | 8/57 | Bradfield | 310—9.1 |
| 2,875,354 | 2/59 | Harris | 310—8.2 |

MILTON O. HIRSHFIELD, *Primary Examiner.*